(12) United States Patent
Hausler et al.

(10) Patent No.: US 8,348,325 B2
(45) Date of Patent: Jan. 8, 2013

(54) VEHICLE TAILGATE HAVING PIVOTING SECONDARY TAILGATE THEREIN

(75) Inventors: Henry W. Hausler, Manchester, MI (US); Brian Robert Sankey, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 12/948,968

(22) Filed: Nov. 18, 2010

(65) Prior Publication Data

US 2012/0126564 A1    May 24, 2012

(51) Int. Cl.
*B62D 33/03* (2006.01)
(52) U.S. Cl. ............................................. 296/51; 296/62
(58) Field of Classification Search .................. 296/50, 296/51, 57.1, 62
See application file for complete search history.

(56) References Cited

U.S. PATENT DOCUMENTS

| | | | | | |
|---|---|---|---|---|---|
| 324,196 | A | * | 8/1885 | Walling | 296/68 |
| 688,448 | A | * | 12/1901 | Thompson | 296/62 |
| 2,991,118 | A | * | 7/1961 | Sleger | 296/62 |
| 4,750,777 | A | * | 6/1988 | Brammer | 296/50 |
| 4,846,487 | A | * | 7/1989 | Criley | 280/166 |
| 4,861,093 | A | * | 8/1989 | Chapman | 296/180.1 |
| 4,889,378 | A | * | 12/1989 | Sims | 296/57.1 |
| 5,205,603 | A | * | 4/1993 | Burdette, Jr. | 296/62 |
| 5,303,947 | A | * | 4/1994 | Gerber | 280/423.1 |
| 5,486,032 | A | * | 1/1996 | Reed et al. | 296/50 |
| 5,711,569 | A | * | 1/1998 | Sovoda | 296/57.1 |
| 5,788,311 | A | * | 8/1998 | Tibbals | 296/62 |
| 5,853,116 | A | * | 12/1998 | Schreiner | 224/404 |
| 5,865,495 | A | * | 2/1999 | Nguyen | 296/50 |
| 5,931,519 | A | * | 8/1999 | Jeffers et al. | 296/57.1 |
| 6,149,219 | A | * | 11/2000 | Schambre et al. | 296/57.1 |
| 6,364,391 | B1 | * | 4/2002 | Everett | 296/51 |
| 6,454,338 | B1 | * | 9/2002 | Glickman et al. | 296/57.1 |
| 6,536,822 | B1 | | 3/2003 | Vagedes et al. | |
| 6,607,232 | B2 | * | 8/2003 | Katulka | 296/57.1 |
| 6,742,822 | B2 | * | 6/2004 | Vejnar | 296/26.11 |
| 6,742,826 | B2 | * | 6/2004 | Humphrey et al. | 296/51 |
| 6,749,246 | B2 | * | 6/2004 | Landwehr | 296/61 |
| 6,764,123 | B1 | * | 7/2004 | Bilyard | 296/61 |
| 6,905,157 | B2 | * | 6/2005 | Kang et al. | 296/55 |
| 6,905,158 | B1 | * | 6/2005 | Bastian | 296/62 |
| 6,913,305 | B1 | * | 7/2005 | Kern et al. | 296/51 |
| 6,941,655 | B1 | * | 9/2005 | Bisland | 29/897.2 |
| 7,111,885 | B1 | * | 9/2006 | Hoffmann et al. | 296/26.11 |
| 7,213,858 | B2 | * | 5/2007 | Smith | 296/57.1 |
| 7,287,799 | B2 | * | 10/2007 | Austin | 296/57.1 |
| 7,347,473 | B2 | | 3/2008 | Miller et al. | |
| 7,490,888 | B2 | * | 2/2009 | Zagoroff | 296/57.1 |
| 7,566,085 | B2 | * | 7/2009 | Jaskolski | 296/57.1 |
| 7,658,427 | B2 | * | 2/2010 | Patton, Jr. | 296/50 |
| 7,712,811 | B2 | * | 5/2010 | Heaman et al. | 296/26.08 |
| 8,061,753 | B2 | * | 11/2011 | Papanikolaou et al. | 296/51 |
| 8,109,552 | B2 | * | 2/2012 | Nelson | 296/26.11 |
| 8,201,869 | B1 | * | 6/2012 | Butlin et al. | 296/57.1 |
| 8,246,098 | B2 | * | 8/2012 | Cheung et al. | 296/51 |
| 2010/0001544 | A1 | * | 1/2010 | Paley | 296/57.1 |

\* cited by examiner

*Primary Examiner* — Glenn Dayoan
*Assistant Examiner* — Paul Chenevert
(74) *Attorney, Agent, or Firm* — Raymond Coppiellie; Price Heneveld LLP

(57) ABSTRACT

A pickup truck tailgate assembly is provided that includes a primary tailgate adapted to pivotally latch to a pickup cargo box and has an opening formed in the central portion thereof. The assembly also includes a secondary tailgate pivotally attached to the primary tailgate in the central opening. The assembly further includes a pivoting connection connecting the secondary tailgate to the primary tailgate so that a secondary tailgate may pivot downward relative to the primary tailgate. The secondary tailgate may further be deployed to form a step for access to the cargo box and may provide a gate for retaining items within the cargo box.

18 Claims, 7 Drawing Sheets

VEHICLE TAILGATE HAVING PIVOTING SECONDARY TAILGATE THEREIN

FIELD OF THE INVENTION

The present invention generally relates to vehicle tailgate assemblies, and more particularly relates to a multiple function tailgate assembly for a pickup truck.

BACKGROUND OF THE INVENTION

Automotive vehicles, such as pickup trucks, are commonly employed with a cargo box or bed that may be used to transport various items. The vehicle cargo box typically has a tailgate which generally extends between the rear lateral walls and pivots about a hinge assembly near a lower edge of the tailgate between an upright vertical closed position and a downward horizontal open position. In the downward open position, cargo may be easily loaded into and unloaded from the cargo box and the tailgate may be pivoted closed to the vertical upward position to retain the cargo within the cargo box.

Some pickup trucks are increasingly employing elongated tailgate assemblies which provide an elevated wall height with increased depth of the cargo box that makes it more difficult to easily reach into the cargo box, without opening the tailgate. Additionally, with the tailgate open, it can still be difficult to reach cargo located forward in the box. In order to load many items into the cargo box, users are generally required to open the entire tailgate prior to loading and to close the tailgate after loading. It is desirable to provide for alternative ways of allowing users to easily access the cargo box without always having to open and close the entire tailgate.

SUMMARY OF THE INVENTION

According to one aspect of the present invention, a vehicle tailgate assembly is provided. The tailgate assembly includes a primary tailgate adapted to pivotally latch to a vehicle cargo box. The tailgate assembly also includes a secondary tailgate pivotally attached to the primary tailgate. The tailgate assembly further includes a pivoting connection connecting the secondary tailgate to the primary tailgate so that the secondary tailgate may pivot downward relative to the primary tailgate.

According to another aspect of the present invention, a pickup truck tailgate assembly comprises a primary tailgate adapted to pivotally latch to a pickup truck cargo box. The primary tailgate has an opening formed in a central portion thereof. The tailgate assembly also includes a secondary tailgate pivotally attached to the primary tailgate in the central opening and a pivoting connection connecting the secondary tailgate to the primary tailgate so that the secondary tailgate may pivot downward relative to the primary tailgate.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
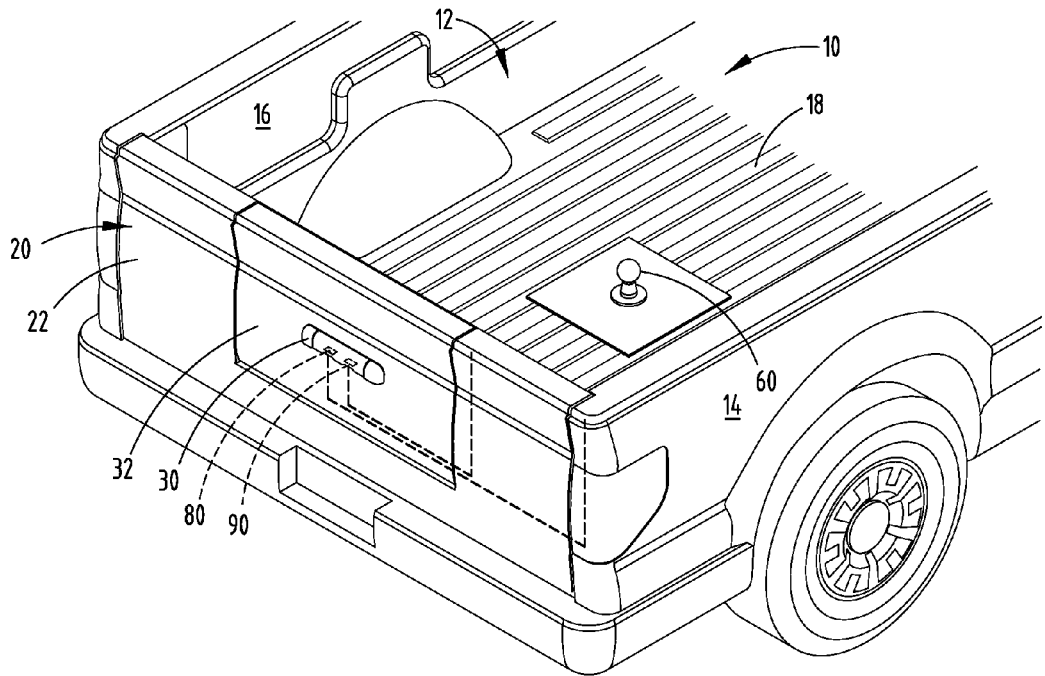
FIG. 1 is a rear side perspective view of a pickup truck cargo box having a tailgate assembly, according to one embodiment.
Figure 1A:
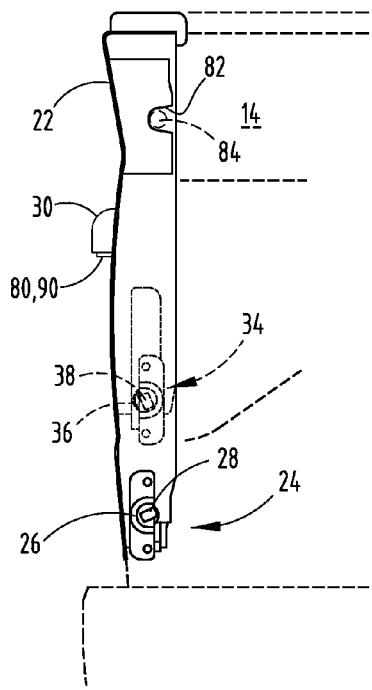
FIG. 1A is a side view of the tailgate assembly shown in FIG. 1 with the tailgate in the vertical closed position.

For purposes of description herein, the terms "upper," "lower," "right," "left," "rear," "front," "vertical," "horizontal," and derivatives thereof shall relate to the vehicle 10 and the tailgate assembly 20 as oriented in FIGS. 1 and 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 1A, an automotive vehicle 10 in the form of a pickup truck is shown having a cargo box or bed 12 and equipped with a tailgate assembly 20 defining a rear wall of the cargo box 12, according to one embodiment. The cargo box 12 generally has a bottom floor 18, and lateral side walls 14 and 16, and a front wall (not shown). The rear wall of the cargo box 12 is defined by the tailgate assembly 20. The tailgate assembly 20 includes a primary tailgate 22 and a secondary tailgate 32 pivotally and latchedly connected to the primary tailgate 22. The tailgate assembly 20 pivots between an upright vertical closed position to serve as the rear wall of the cargo box 12 and a downward open position generally shown horizontal in FIG. 4. The tailgate assembly 20 includes a main or primary tailgate 22 extending between the lateral walls 14 and 16 and having a pair of hinge pivots 24 on opposite left and right sides near the bottom edge. The primary tailgate 22 may include a pair of support cables 88 connected at each end to the vehicle body structure such as the D-Pillars to support the tailgate assembly 20 and any load applied thereto when in the horizontal open position. The hinge pivots 24 may each include a hinge socket 28 and a pivot bracket 26 that allows the primary tailgate 22 to pivot about the bottom edge relative to a supporting vehicle structure, such as the D-pillars. The hinge pivots 24 may be keyed to allow removal of the primary tailgate 22 from the vehicle 10. The hinge pivots 24 may include a lift assist mechanism such as a torsion bar 86.

Figure 2:
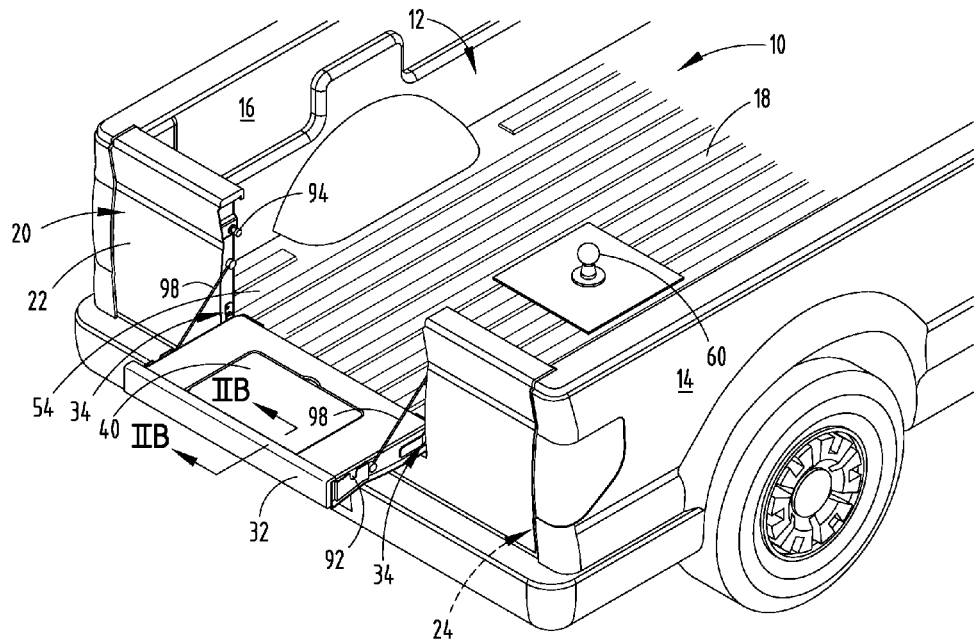
FIG. 2 is a rear side perspective view of the pickup truck cargo box with the tailgate assembly having a secondary tailgate in the horizontal open position.
Figure 4:
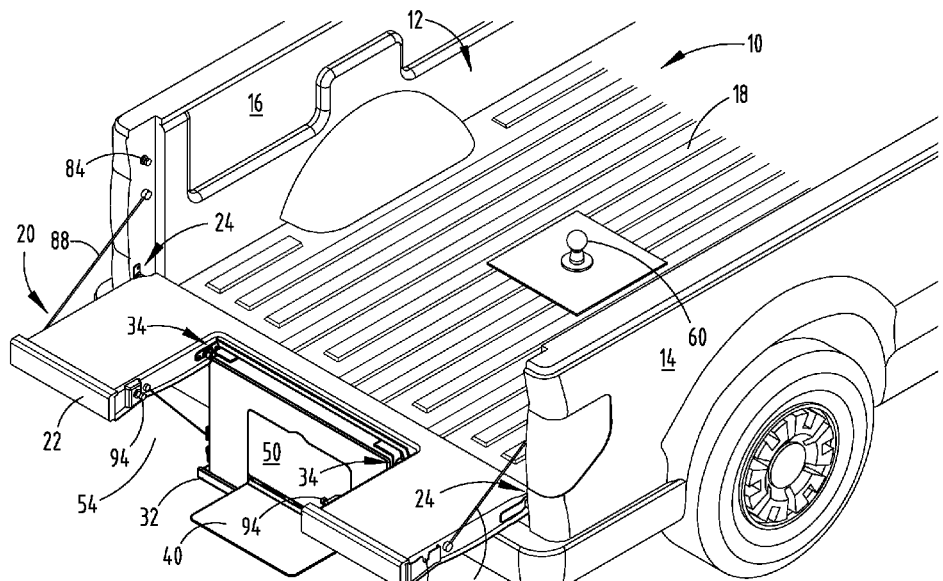
FIG. 4 is a rear side perspective view of the pickup truck cargo box having the tailgate assembly with the secondary tailgate in a downward open position with step and gate member deployed as a step.

The primary tailgate 22 includes an opening or cutout 54 provided in the central region for receiving the secondary tailgate 32. The secondary tailgate 32 is smaller than the primary tailgate 22 and in the embodiment shown, the secondary tailgate pivots relative to the primary tailgate 22 via hinge pivots 34. The secondary tailgate 32 may be in an upright vertical closed position as shown in FIG. 1, or a horizontal open position as shown in FIG. 2, or further may pivot to drop down to a lowered step position when the primary tailgate 22 is in the horizontal open position as shown in FIG. 4. The secondary tailgate 32 includes a pair of hinge pivots 34 in opposite left and right sides near the bottom edge for connection to the primary tailgate 22. The hinge pivots 34 may each include a hinge socket 38 and a pivot bracket 36 that allows the secondary tailgate 32 to pivot about the bottom edge relative to the supporting primary tailgate 22. The hinge pivots 34 may be keyed to allow removal of the secondary tailgate 32 from the primary tailgate 22. The hinge pivots 34 may include a lift assembly mechanism such as torsion bar 96. Additionally, support cables 98 are connected at each end of the secondary tailgate 32 to the primary tailgate 22 to support the secondary tailgate 32 when the secondary tailgate 32 is pivoted to an open position relative to the primary tailgate 22.

The primary tailgate 22 further includes latch mechanisms 82 located on opposite sides near the top edge configured to engage and latch onto rods 84 on the cargo box structure, such as the D-pillar, to retain the primary tailgate 22 latched in the closed position. Similarly, the secondary tailgate 32 has latch mechanisms 92 located on opposite sides near a top edge for likewise engaging rods 94 within opening 54 of the primary tailgate 22 to latch the secondary tailgate 32 closed to the primary tailgate 22. The latch mechanisms of the primary tailgate 22 and secondary tailgate 32 may employ conventional latching assemblies. The latch mechanisms 82 and 92 may be controlled to open in response to actuation of primary and secondary switches 80 and 90 which are shown built into a tailgate release latch handle 30. In one embodiment, switch 80 may be actuated by a user to unlatch latch mechanism 82 to open the primary tailgate 22 and switch 90 be actuated by a user to unlatch latch mechanism 92 to open the secondary tailgate 32. In one embodiment, latch mechanism 82 and 92 may be electronically actuated to the unlatched position in response to actuation of switches 80 and 90. However, it should be appreciated that the switches 80 and 90 and latch mechanisms 82 and 92 may be otherwise configured such as mechanical user actuated devices.

Figure 2B:
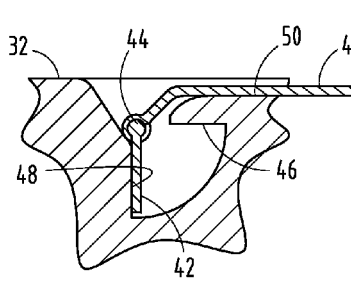
FIG. 2B is an enlarged sectional view of section IIB shown in FIG. 2 further illustrating the pivoting step and gate member.
Figure 2A:
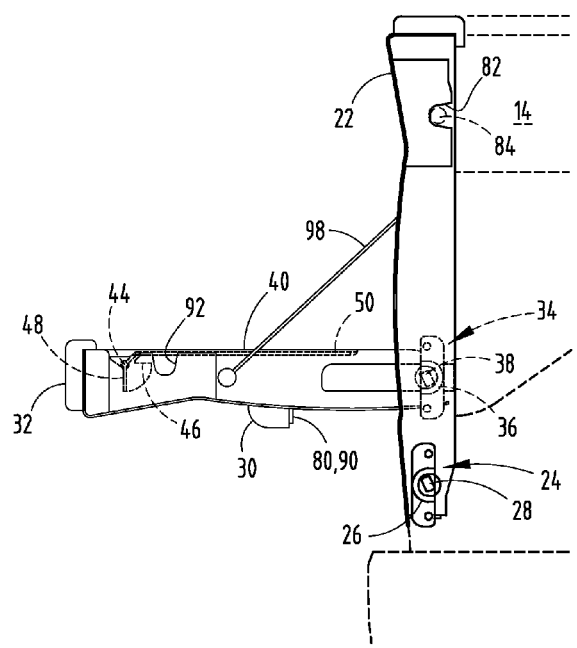
FIG. 2A is a side view of the tailgate assembly shown in FIG. 2 with the secondary tailgate in the horizontal open position.
Figure 3:
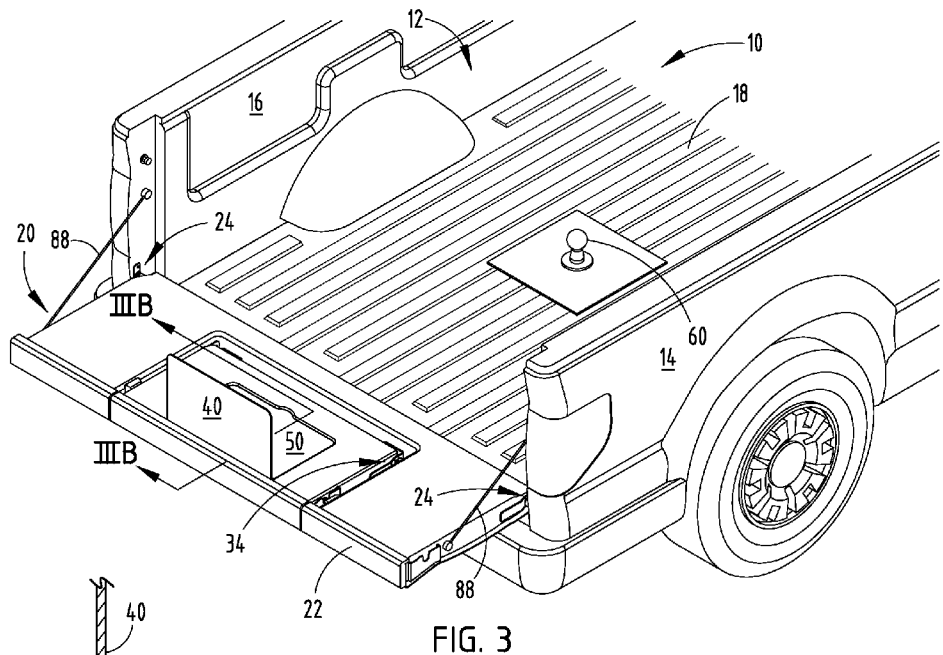
FIG. 3 is a rear side perspective view of the pickup truck cargo box with the tailgate assembly shown having the primary tailgate in the open position and the step and gate member deployed in a cargo gate position.
Figure 3B:
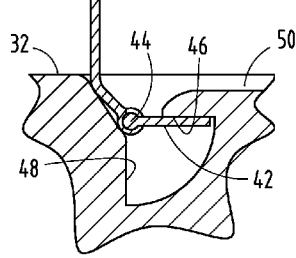
FIG. 3B is an enlarged sectional view of section IIIB shown in FIG. 3 with the step in the cargo gate position.
Figure 3A:
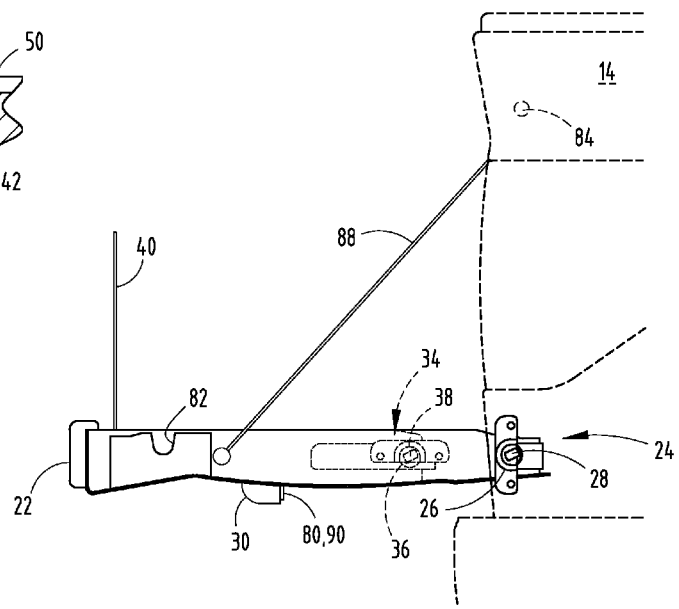
FIG. 3A is a side view of the tailgate assembly shown in FIG. 3 with the step and gate member deployed and gate member deployed in the cargo gate position.
Figure 4A:
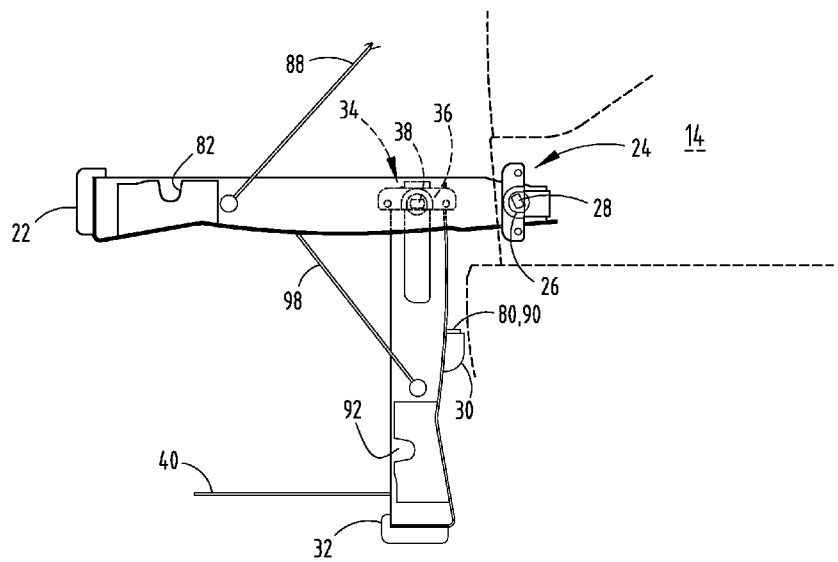
FIG. 4A is a side view of the tailgate assembly shown in FIG. 4 with the step and gate member deployed as a step.
Figure 5:
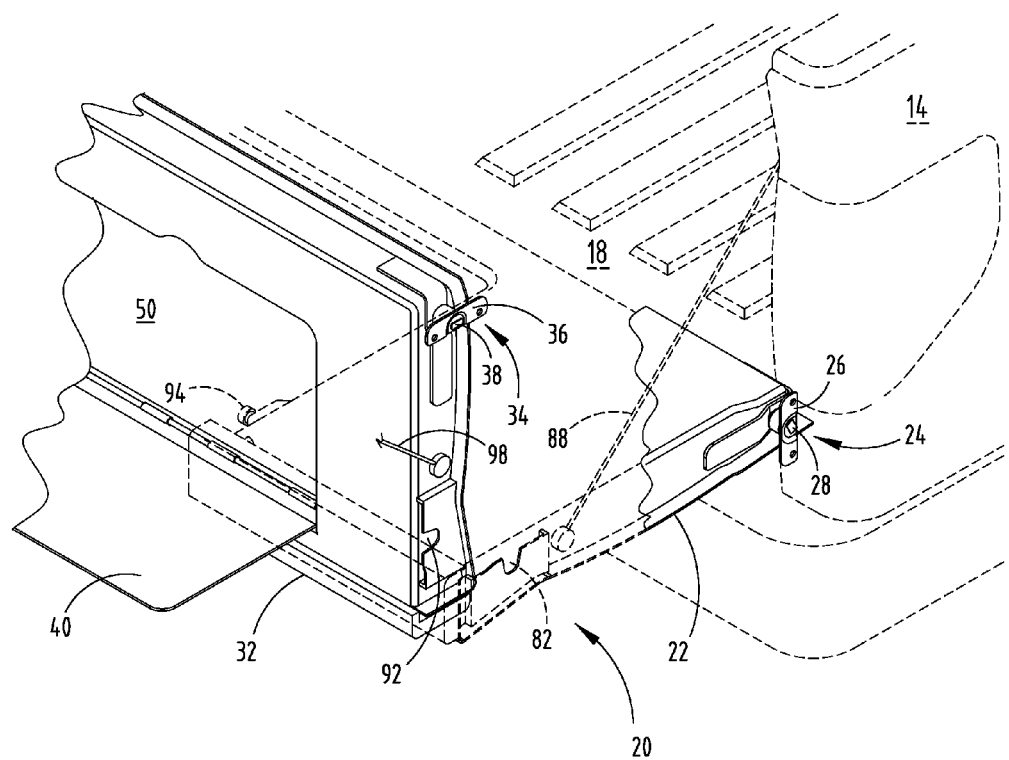
FIG. 5 is a rear side perspective view of the pickup cargo box further illustrating the pivoting hinge arrangements of the primary and secondary tailgates in the downward open positions.

The vehicle tailgate assembly 20 includes the primary tailgate 22 adapted to pivot relative to the vehicle cargo box 12 and to latch closed onto the vehicle cargo box 12, and the secondary tailgate 32 is adapted to pivot relative to the primary tailgate 22 and to latch closed onto the primary tailgate 22. The tailgate assembly 20 also includes a pair of pivoting connections shown as hinge pivots 34 connecting the secondary tailgate 32 to the primary tailgate 22 so that the secondary tailgate 32 may pivot downward relative to the primary tailgate 22. In one application, the secondary tailgate 32 may be pivoted downward relative to the primary tailgate 22 when the primary tailgate 22 is in the upright closed position as shown in FIGS. 2 and 2A. In this position, a user may open the smaller of the two tailgates 22 and 32 and gain access to the cargo bed 12 for ease in loading and unloading smaller items. In another application, the primary tailgate 22 may be opened to its horizontal open position as shown in FIGS. 3 and 3A with the secondary tailgate 32 retained thereto in its latched closed position. In this position, a larger access to the cargo box 12 is provided. The secondary tailgate 32 has a combination step and gate member 40 provided therein which pivots ninety degrees (90°) between a stowed position as shown in FIGS. 2-2B in which step and gate member 40 is disposed and stored within depression 50 of secondary tailgate 32. Step and gate member 40 is generally L-shaped includes a foot 42 that pivots about pivot 44 such that the foot 42 engages surface 48 in the stowed position and rotates ninety degrees (90°) to engage surface 46 in the outward deployed gate position as shown in FIGS. 3-3B or step position as shown in FIGS. 4 and 4A. As shown in FIGS. 3-3B, step 40 extends vertically upward to form a gate for retaining items that may be stored within the cargo box 12 while the tailgate assembly 20 is in its downward and horizontal use position. In the example shown, the step and gate member 42 has a height of approximately six inches and may extend a substantial length of the secondary tailgate 32 such as thirty-six (36) inches in one example.

Referring to FIGS. 4 and 4A, the tailgate assembly 20 is shown with the primary tailgate 22 in the downward horizontal open position and the secondary tailgate 32 pivoted downward relative thereto to an open step position. In this position, the lift in distance to the cargo box 12 is reduced such that a user may reach further into the cargo box 12 in the open space provided in the primary tailgate 22 by the downward rotation of the secondary tailgate 32 to allow for easy access to items stowed within the cargo box 12. Additionally, the secondary tailgate 32 may have the step and gate member 40 deployed outward to form a step to enable a user to step onto and into the cargo box 12 to allow for easy entry by a user into and out of the cargo box 12. Thus, the secondary tailgate 32 further advantageously provides for a built-in step function.

Figure 6:
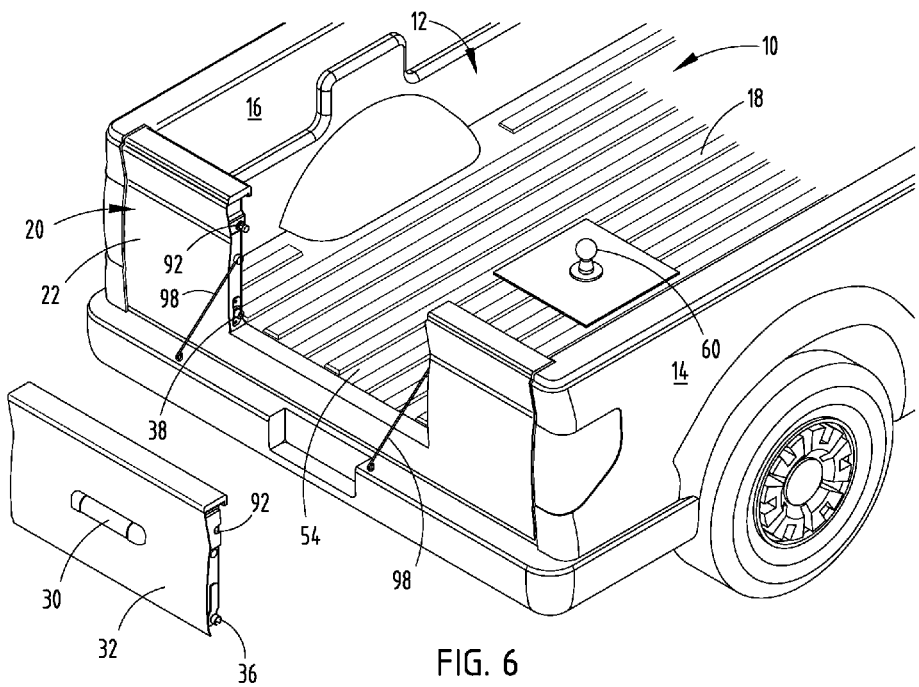
FIG. 6 is a rear side perspective view of the pickup cargo box illustrating removal of the secondary tailgate from the tailgate assembly.

It should be appreciated that the primary tailgate 22 may be removed from the body of the vehicle 10 by rotating the hinge socket 28 relative to hinge bracket 26 to a certain position and disconnecting the hinge socket 28 from the hinge bracket 26. Additionally, it should be appreciated that the secondary tailgate 32 may be removed from the primary tailgate 22 as shown in FIG. 6. Removal of the secondary tailgate 32 from the primary tailgate 22 may be achieved likewise by rotating the hinge socket 38 and pivot bracket 36 to a certain position and removing the hinge socket 38 relative to the pivot bracket 36. It should be appreciated that disconnection of the secondary tailgate 32 from the primary tailgate 22 may require disconnection of cables 98 and any cables associated with the latch mechanism control functions.

Figure 7:
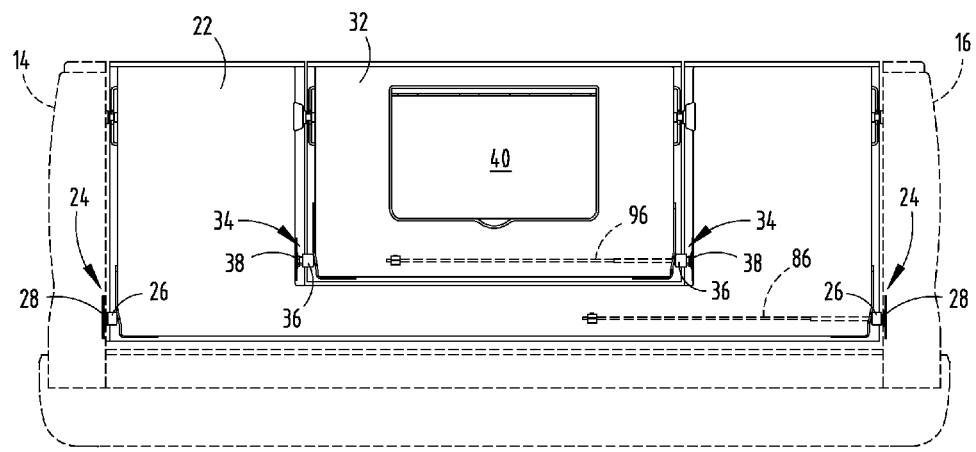
FIG. 7 is a rear view of the tailgate assembly with torsion bar feature shown in dashed lines.

Referring to FIG. 7, the primary tailgate 22 is shown equipped with a torsion bar 86 that extends from the hinge pivots 24. The torsion bar 86 acts as a spring mechanism to provide lift assist to the primary tailgate 22. Similarly, a torsion bar 96 is shown provided connected to the hinge pivot 24 of the secondary tailgate 32. The torsion bar 96 likewise provides lift assist to the secondary tailgate 32.

Figure 8:
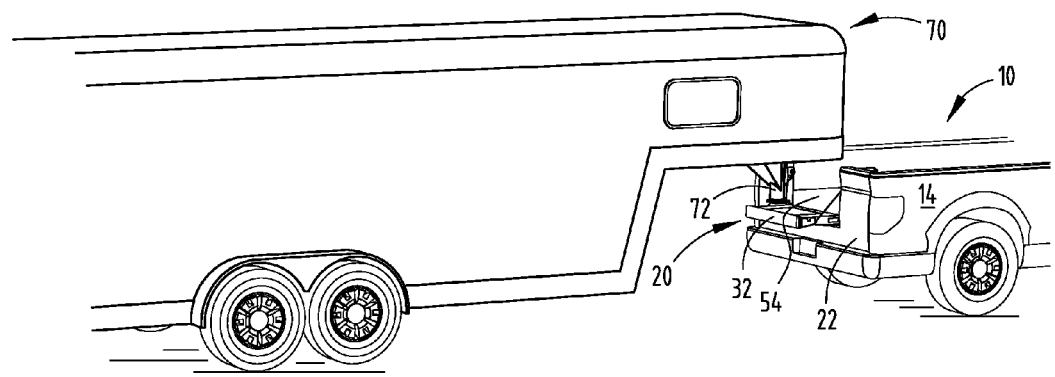
FIG. 8 is a side perspective view of a fifth wheel trailer can attach through an opening in the tailgate assembly with the secondary tailgate open.
Figure 9:
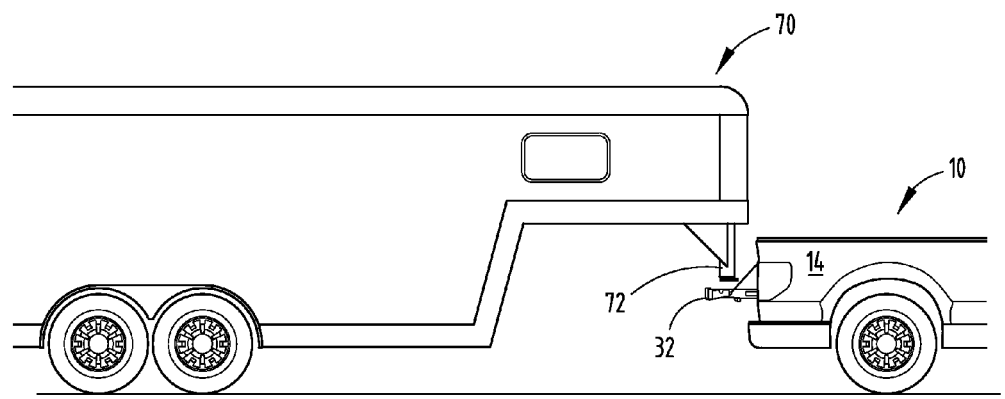
FIG. 9 is a side view of the trailer ready for engagement through the opening of the tailgate assembly.
Figure 10:
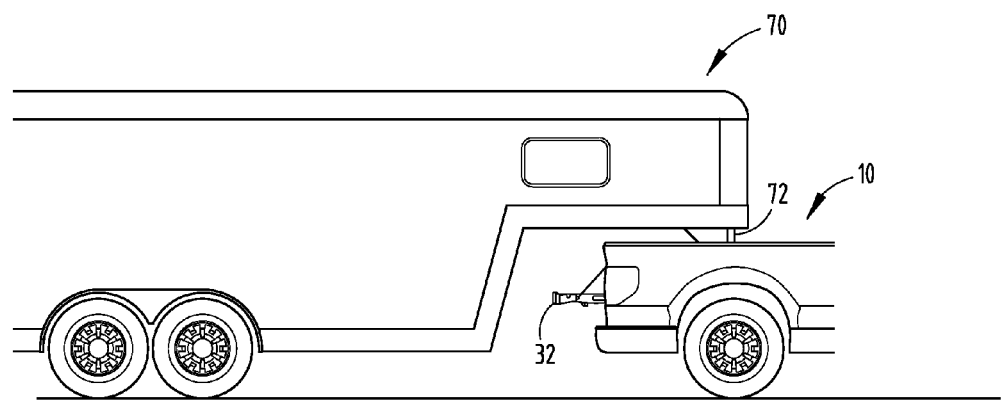
FIG. 10 is a side view of the trailer connected to a fifth wheel hitch assembly in the cargo bed of the vehicle.

Referring to FIGS. 8-10, the tailgate assembly 20 is further illustrated in use for connecting a fifth wheel hitch assembly 72 of a tow trailer 70 to the vehicle 10. In doing so, the secondary tailgate 32 may be lowered to a horizontal open position relative to the primary tailgate 22 to create an opening 54 such that the fifth wheel hitch assembly 72 of the trailer 70 can be inserted through the opening 54 and into the cargo box 12 and connected to the hitch mount 60 therein. Thus, the secondary tailgate 32 allows for a smaller opening 54 to be provided allowing access and pivot rotation of a trailer hitch assembly 72 for a fifth wheel hitch mount. It should be appreciated that the secondary tailgate 32 could be removed from the primary tailgate 22 according to another embodiment to allow for connection of the fifth wheel hitch assembly 72 to hitch mount 60.

The tailgate assembly 20 shown and described herein includes a secondary tailgate 32 centrally located within the tailgate 22 of a pickup truck 10 such that the secondary tailgate 32 pivots relative to the primary tailgate 22. The secondary tailgate is centrally located within the primary tailgate so as to create an opening 54 within the central and upper portions of the primary tailgate 22. The opening 54 is a U-shape as shown in FIG. 6. It should be appreciated that the secondary tailgate may be provided in different size to fit the needs of the user and may be located at a location other than the center of the primary tailgate 22. For example, the secondary tailgate may be formed on a left side or a right side of the primary tailgate such that the primary tailgate and the secondary tailgate are independently operable together to form the entire vehicle tailgate.

Accordingly, the tailgate assembly 20 advantageously provides for a multifunctional tailgate arrangement for a vehicle 10, such as a pickup truck. The tailgate assembly 20 allows for easy access of cargo items in the cargo box 12 by use of a smaller built-in secondary tailgate 32 that pivots relative to a main tailgate 22. The tailgate assembly 20 further provides for a built-in step 40 that allows a user to step up into the vehicle cargo box 12 and also serves as a gate to retain items stored within the cargo box 12.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle tailgate assembly comprising:
   a primary tailgate having an opening along its top edge pivotally attached to a vehicle cargo box;
   a secondary tailgate pivotally attached to the primary tailgate within the opening; and
   a pivoting connection connecting the secondary tailgate to the primary tailgate so the secondary tailgate pivots downward relative to the primary tailgate and a step pivots between stowed and step positions on the secondary tailgate when in the downward position.

2. A vehicle tailgate assembly comprising:
   a primary tailgate having an opening along its top edge adapted to pivotally latch to a vehicle cargo box;
   a secondary tailgate pivotally attached to the primary tailgate within the opening; and
   a pivoting connection connecting the secondary tailgate to the primary tailgate so that the secondary tailgate may pivot downward relative to the primary tailgate, wherein the secondary tailgate comprises a step that pivots between stowed and step positions on the secondary tailgate in the downward open position.

3. The tailgate assembly of claim 2, wherein the secondary tailgate is located in a center portion of the primary tailgate.

4. The tailgate assembly of claim 2, wherein the secondary tailgate is located off-center.

5. The tailgate assembly of claim 2, wherein the step further serves as a cargo gate when the secondary tailgate in a substantially horizontal position.

6. The tailgate assembly of claim 2, wherein the vehicle comprises a pickup truck.

7. The tailgate assembly of claim 2 further comprising a lift assist assembly coupled to the pivoting connector for providing lift assist to the secondary tailgate.

8. The tailgate assembly of claim 7, wherein the lift assist assembly comprises a spring.

9. The tailgate assembly of claim 2 further comprising a latch for latching the secondary tailgate to the primary tailgate.

10. The tailgate assembly of claim 9 further comprising a release button for releasing the latch to allow the secondary tailgate to pivot relative to the primary tailgate.

11. The tailgate assembly of claim 2, wherein the secondary tailgate is removable from the primary tailgate.

12. The tailgate assembly of claim 11, wherein the removal of the secondary tailgate from the primary tailgate allows a fifth wheel hitch to be extended through an opening formed by removal of the secondary tailgate.

13. A pickup truck tailgate assembly comprising:
   a primary tailgate adapted to pivotally latch to a pickup truck cargo box and having an opening formed in a central portion thereof;
   a secondary tailgate pivotally attached to the primary tailgate in the central opening; and
   a pivoting connection connecting the secondary tailgate to the primary tailgate so that the secondary tailgate may pivot downward relative to the primary tailgate, wherein the secondary tailgate comprises a step that pivots between stowed and step positions on the secondary tailgate in the downward open position.

14. The tailgate assembly of claim 13, wherein the step further serves as a cargo gate when the secondary tailgate is in a substantially horizontal position.

15. The tailgate assembly of claim 13 further comprising a lift assist assembly coupled to the pivoting connector for providing a lift assist to the secondary tailgate.

16. The tailgate assembly of claim 13 further comprising a latch for latching the secondary tailgate to the primary tailgate.

17. The tailgate assembly of claim 13, wherein the secondary tailgate is removable from the primary tailgate.

18. The tailgate assembly of claim 17, wherein the removal of the secondary tailgate from the primary tailgate allows a fifth wheel hitch to be extended through an opening formed by removal of the secondary tailgate.

* * * * *